United States Patent
Flodman et al.

(10) Patent No.: US 9,856,005 B2
(45) Date of Patent: Jan. 2, 2018

(54) OUTBOARD DRIVE DEVICE WITH POWER COUPLING SYSTEM

(71) Applicants: Christer Flodman, Hjärnarp (SE);
Andreas Blomdahl, Ängelholm (SE)

(72) Inventors: Christer Flodman, Hjärnarp (SE);
Andreas Blomdahl, Ängelholm (SE)

(73) Assignee: CIMCO MARINE AB (SE)

( * ) Notice: Subject to any disclaimer, the term of this patent is extended or adjusted under 35 U.S.C. 154(b) by 236 days.

(21) Appl. No.: 14/299,246

(22) Filed: Jun. 9, 2014

(65) Prior Publication Data

US 2015/0353177 A1    Dec. 10, 2015

(51) Int. Cl.
*B63H 20/20* (2006.01)
*F16H 1/00* (2006.01)

(52) U.S. Cl.
CPC .............. *B63H 20/20* (2013.01); *F16H 1/00* (2013.01)

(58) Field of Classification Search
CPC .................. B63H 2023/025; B63H 2023/0216
See application file for complete search history.

(56) References Cited

U.S. PATENT DOCUMENTS

| | | | |
|---|---|---|---|
| 1,662,301 A * | 3/1928 | Coykendall | B63H 23/00 440/75 |
| 2,722,193 A | 11/1955 | Brindley | |
| 4,382,797 A | 5/1983 | Blanchard | |
| 4,408,994 A | 10/1983 | Blanchard | |
| 4,559,018 A | 12/1985 | Nakahama et al. | |
| 4,869,692 A | 9/1989 | Newman | |
| 4,887,983 A | 12/1989 | Bankstahl et al. | |
| 4,925,413 A | 5/1990 | Newman et al. | |
| 4,992,066 A | 2/1991 | Watson | |
| 5,178,566 A | 1/1993 | Stojkov et al. | |
| 5,435,763 A | 7/1995 | Pignata | |
| 5,879,210 A | 3/1999 | Goto et al. | |
| 5,938,490 A | 8/1999 | Rodler | |
| 5,961,358 A | 10/1999 | Hardesty et al. | |
| 6,206,739 B1 | 3/2001 | Dadd et al. | |
| 6,884,131 B2 | 4/2005 | Katayama et al. | |
| 6,910,987 B2 | 6/2005 | Richards | |
| 8,662,945 B2 | 3/2014 | Blomdahl | |

(Continued)

FOREIGN PATENT DOCUMENTS

SE    EP 2229315 B1 *  7/2013  ............. B63H 20/14
WO    9119643 A1    12/1991

OTHER PUBLICATIONS

PCT International Search Report dated Aug. 26, 2008 for International Application No. PCT/SE2007/050983, 4 pages.

*Primary Examiner* — Edwin Swinehart
(74) *Attorney, Agent, or Firm* — Fredrikson & Byron, P.A.

(57) ABSTRACT

An outboard drive device comprising a motor having a crankshaft, wherein said outboard drive device further comprises a propeller shaft with a propeller, and a power coupling system for transferring power from the motor to the propeller shaft. The power coupling system involves a transmission including side-by-side positioning of forward and reverse gears of the device, which are rotatably engaged with a drive shaft. Particular variables of the system enable increased power output to be transmitted through the transmission, while also providing quick and efficient power distribution among different rotations of the propeller shaft of the device.

29 Claims, 2 Drawing Sheets

(56) References Cited

U.S. PATENT DOCUMENTS

Figure 1:
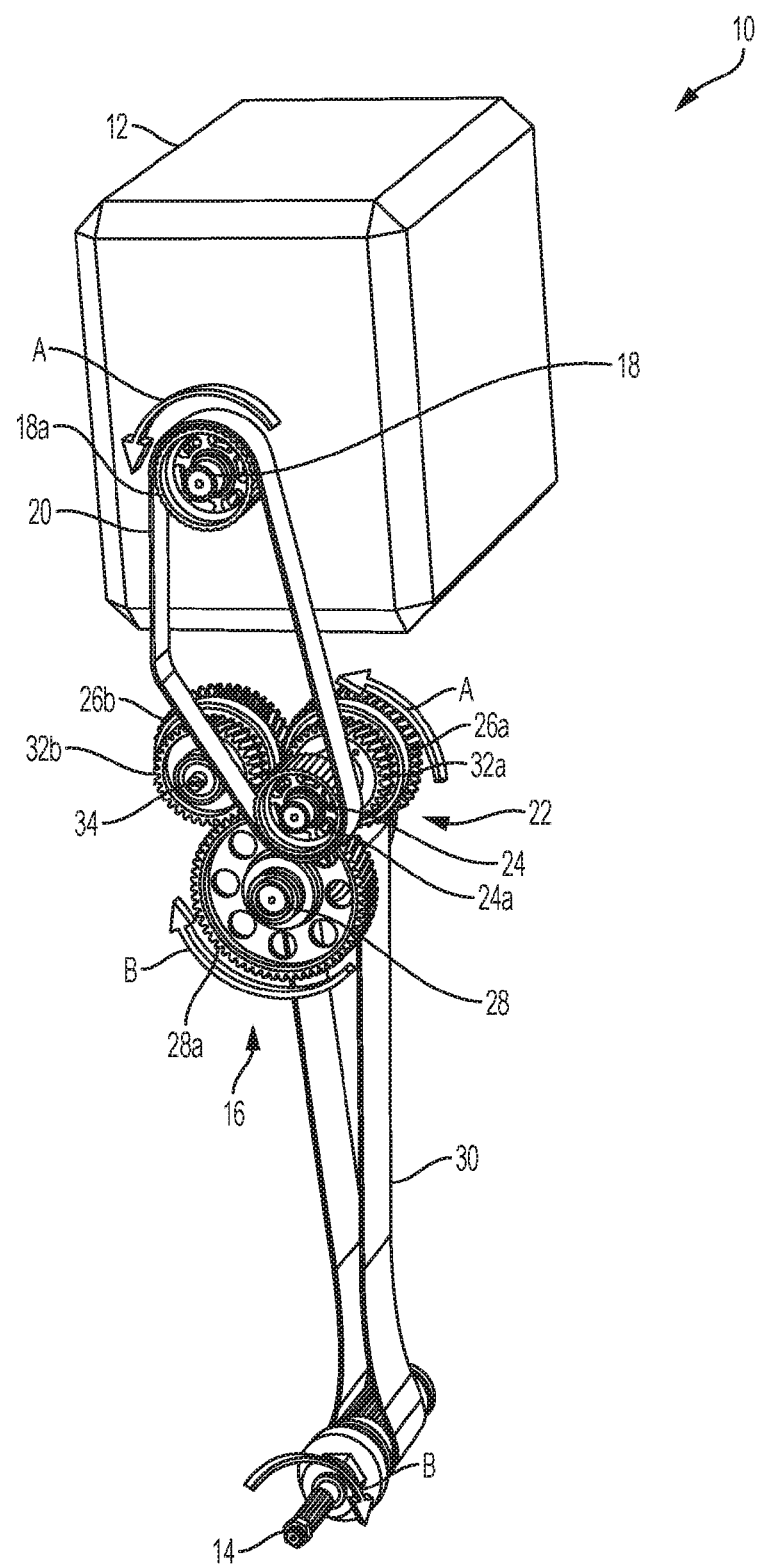

2006/0052014 A1  3/2006  Kobayashi
2006/0172630 A1  8/2006  Kawamoto
2006/0199451 A1  9/2006  Broussard
2014/0179179 A1  6/2014  Blomdahl

* cited by examiner

_(10)_ US 9,856,005 B2_

OUTBOARD DRIVE DEVICE WITH POWER COUPLING SYSTEM

FIELD OF THE INVENTION

The present invention relates to an outboard drive device for a boat. More specifically, the present invention relates to an outboard drive device comprising a motor with crankshaft, a propeller situated below the motor when said outboard drive device is operated with a boat, and a power coupling system for transferring power from the motor to the propeller.

BACKGROUND

A variety of differing outboard drive devices are known from prior art. Generally, such outboard drive devices include a motor housed in an upper portion of the drive device. In some cases, a crank shaft of the motor extends substantially vertically downward to a propeller shaft arranged in a lower portion of the outboard drive device. The propeller shaft, unlike the crank shaft, is often oriented to be substantially horizontal when said outboard drive device is operated. For example, the vertical crankshaft is connected to the horizontal propeller shaft by means of bevel gears for transferring torque from the vertical crankshaft to the horizontal propeller shaft.

Another known type of outboard drive device involves a motor having a crankshaft extending substantially horizontally. To that end, the crankshaft is connected to a horizontal propeller shaft through a vertically extending drive shaft and bevel gears. In some cases, a forward/reverse/neutral transmission can be arranged between the crankshaft and the vertical drive shaft.

A further known type of outboard drive device involves an outboard propulsion system comprising a motor having a horizontal crankshaft connected to a water jet through a belt.

One problem with conventional outboard drive devices is that they are limited in terms of the motors (or engines) they are able to be configured with, which is often a consequence of their power transmission systems. To that end, even when the power transmission systems are modified to be more durable in functioning with larger, more powerful motors, they correspondingly are complex in design, and thus expensive to produce and maintain over time. Embodiments of the present invention are intended to the address the above-described challenges as well as others.

BRIEF SUMMARY OF SOME EMBODIMENTS OF THE INVENTION

The present invention relates to an outboard drive device including a motor having a crankshaft, wherein said outboard drive device further comprises a propeller shaft with a propeller, and a power coupling system for transferring power from the motor to the propeller shaft. The power coupling system involves a transmission including side-by-side positioning of forward and reverse gears of the device, which are rotatably engaged with a drive shaft. Particular variables of the system enable increased power output to be transmitted through the transmission, while also providing quick and efficient power distribution among different rotations of the propeller shaft of the device.

In one embodiment of the invention, an outboard drive device for a boat is provided. The outboard drive device comprises a motor having a crankshaft, wherein said outboard drive device further comprises a propeller shaft for rotating a propeller, and a power coupling system for transferring power from the motor to the propeller shaft. The power coupling system comprises a transmission. The transmission comprises a transmission drive shaft, first and second power transfer means with corresponding forward and reverse gears, and a drive shaft. The first and second power transfer means are selectively engageable with the corresponding forward and reverse gears. The power coupling system at its input includes a power transfer device connecting the crankshaft of the motor with the transmission drive shaft, and the system at its output includes an endless loop flexible drive coupling connecting the drive shaft with the propeller shaft. The first and second power transfer means are rotatably connected with the transmission drive shaft. The forward and reverse gears are situated on separate gear shafts of the transmission. The forward and reverse gears are rotatably engaged with the drive shaft and transfer power to said drive shaft when the forward or reverse gears are engaged by corresponding of the first and second power transfer means.

In another embodiment of the invention, an outboard drive device for a boat is provided. The outboard drive device comprises a motor having a crankshaft, wherein said outboard drive device further comprises a propeller shaft for rotating a propeller, and a power coupling system for transferring power from the motor to the propeller shaft. The power coupling system comprises a transmission. The transmission comprises a transmission drive shaft, first and second power transfer means with corresponding forward and reverse gears, and a drive shaft. The first and second power transfer means are selectively engageable with the corresponding forward and reverse gears. The power coupling system at its input includes a power transfer device connecting the crankshaft of the motor with the transmission drive shaft, and the system at its output includes an endless loop flexible drive coupling connecting the drive shaft with the propeller shaft. The first and second power transfer means are rotatably connected with the transmission drive shaft. The forward and reverse gears are gear wheels. Each of the forward and reverse gear wheels are rotatably connected with a gear wheel of the drive shaft. The forward gear when engaged by the first power transfer means and rotated correspondingly rotates the gear wheel of the drive shaft, which results in corresponding rotation of the propeller shaft in a first direction. The reverse gear when engaged by the second power transfer means and rotated correspondingly rotates the gear wheel of the drive shaft, which results in corresponding rotation of the propeller shaft in a second direction.

BRIEF DESCRIPTIONS OF THE DRAWINGS

The following drawings are illustrative of particular embodiments of the present invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

Figure 2:
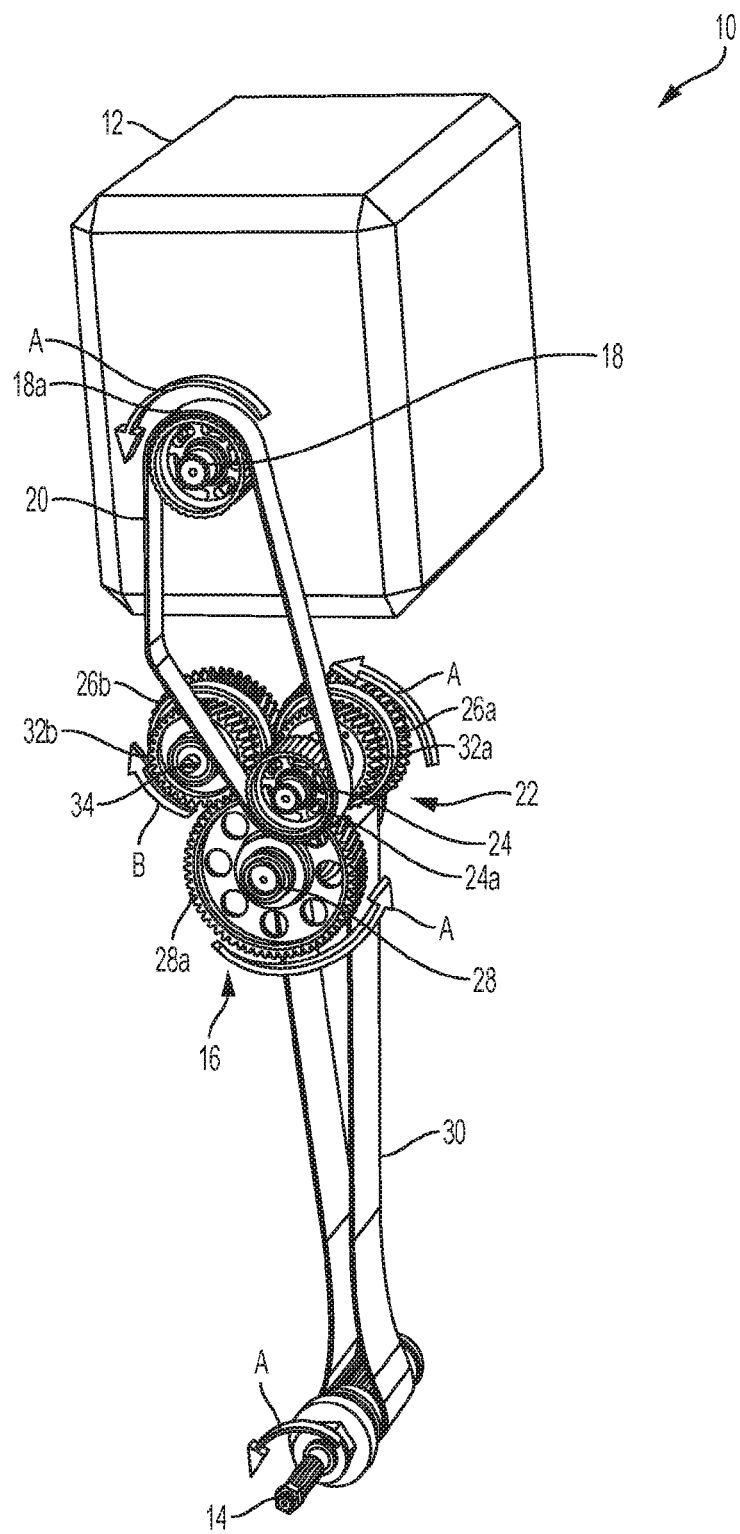

FIG. 1 is a perspective side view of an outboard drive device in accordance with certain embodiments of the invention, wherein functioning of a power coupling system of the device is depicted with regard to rotation of a propeller shaft of the device in a clockwise direction; and FIG. 2 is the same view of the outboard drive device of FIG. 1, but depicting function of the power coupling system with regard to rotation of the propeller shaft of the device in a counter-clockwise direction in accordance with certain embodiments of the invention.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

As already noted above, FIGS. 1 and 2 show same view of an outboard drive device 10 in accordance with certain embodiments of the invention. The outboard drive device 10 includes a motor 12, a propeller shaft 14 for driving a propeller (not shown) and a power coupling system 16 for transferring power from the motor 12 to the propeller shaft 14. As should be appreciated (and as further detailed below), the motor 12 is schematically illustrated as a block within the drawings, and is merely done to keep the drawings simplified. As further shown, the motor 12 includes a crankshaft 18 that protrudes and extends from the motor 12, and which rotates when the motor 12 is run. With reference to the motor 12 with crankshaft 18, the power coupling system 16, and the propeller shaft 14, it should be appreciated that the outboard drive device 10 is configured with one or more housings to contain these assemblies. However, in order to detail the operation of the device 10 with sufficient illustration, these one or more housings are not shown.

Continuing with the above, while also not illustrated (but would be understood by the skilled artisan), the outboard drive device 10 is generally configured for being mounted to a hull of a boat, whereby the device 10 can be fastened/removed from the boat as necessary. To that end, when fastened to a boat, the outboard drive device 10 would generally extend downward from the boat hull. For example, while not shown, the outboard drive device 10 would generally include fastening means (typically, on an upper front side of a housing containing the motor 12) for fastening the device 10 to a stern of the boat hull. Commonly, such fastening means can also include a trim/tilt system, such as a hydraulic or electric trim/tilt system, for raising or lowering the propeller shaft 14 (and propeller thereon) from or into the water. For example, upon the outboard drive device 10 being fastened to the boat hull, to further situate the device 10 for operation, the propeller shaft 14 and the propeller are lowered below the water line (and thus, also below the boat hull). Hence, the outboard drive device 10 is arranged to project a distance into the water when operated, such that the propeller shaft 14 and a lower portion of the device 10 are immersed in the water, with the propeller shaft 14 (and propeller) being well below the water line.

As described above, the motor 12 includes the crankshaft 18, which is rotated by the motor 12 so as to provide output power. With reference to FIGS. 1 and 2, in certain embodiments, the crankshaft 18 extends substantially horizontally from the motor 12 when the outboard drive device 10 is operated. However, in the context of the embodiments described herein, a skilled artisan would recognize that the crankshaft 18 can be somewhat angled. As such, in certain embodiments, the crankshaft 18 can deviate from being substantially horizontally as it extends from the motor 12. In certain embodiments, the crankshaft 18 can deviate from the horizontal plane, for example, by no more than 10°, perhaps more preferably by no more than 5°, and perhaps even more preferably by no more than 2°. For example, the crankshaft 18 can be arranged with an angle of no more than 10° from horizontal, and preferably no more than 5° from horizontal, or alternately, the crankshaft 18 can simply extend in the horizontal plane (so as to be generally parallel to the longitudinal axis of the boat).

In certain embodiments, the crankshaft 18 is arranged substantially parallel to the propeller shaft 14. However, in certain embodiments, the crankshaft 18 and propeller shaft 14 can deviate from being substantially parallel to one another. In certain embodiments, the angle between an axis of the crankshaft 18 and an axis of the propeller shaft 14 can be no more than 20°, perhaps more preferably no more than 10° and perhaps even more preferably no more than 5°. In certain embodiments, the crankshaft 18 can be arranged lengthwise with the boat, wherein the crankshaft 18 extends along the longitudinal axis of the boat. Thus, in such cases, the propeller shaft 14 is also situated to extend substantially parallel to the longitudinal axis of the boat.

The motor 12 of the outboard drive device 10 can be an outboard motor. However, as will detailed herein, the design of the outboard drive device 10 enables more powerful motors (that are non-typical for outboard drive devices) to be configured with the device 10. To that end, in certain embodiments, the motor 12 is an automotive engine or an industrial base engine. For example, the motor 12 can be a diesel V8 engine. For further reference, the motor 12, in certain embodiments, can provide power output up to and greater than 1000 hp, e.g., with the power output of the motor 12 generally ranging from 100 kW (approximately 134 hp) to 1000 kW (approximately 1341 hp). As will be further detailed, the system 16 features a plurality of engaging gear wheels, the configuration of which has been found to provide stable and efficient operation (particularly for outboard drive device applications), even when driven by significant power input, e.g., such as from an automotive engine or industrial base engine.

In certain embodiments, as shown in FIGS. 1 and 2, the power coupling system 16 at its input includes a power transfer device 20 used to connect the crankshaft 18 of the motor 12, while the system 16 at its output further includes an endless loop flexible drive coupling 30 used to connect the propeller shaft 14. In certain embodiments, with reference to FIGS. 1 and 2, one or both of the power transfer device 20 and the endless loop flexible drive coupling 30 can take the form of a belt (e.g., toothed belt); however, the invention should not be limited to such. For example, one or both of the power transfer device 20 and the endless loop flexible drive coupling 30 can alternatively involve a chain or interlocking gear wheels which connect to corresponding portions of the power coupling system 16.

Turning back to the power coupling system 16, as shown in FIGS. 1 and 2, the system 16 involves a transmission 22. The transmission 22 includes a transmission drive shaft 24 with corresponding drive shaft gear wheel 24a, first and second power transfer means 26a and 26b, and a drive shaft 28 with corresponding drive shaft gear wheel 28a. As described above, for transfer of power from the motor 12, the crankshaft 18 can be connected to the transmission drive shaft 24 via the power transfer device 20. In certain embodiments as shown, the power transfer device 20 connects corresponding gear wheels 18a and 24a situated on the shafts 18 and 24, respectively. As illustrated, in certain embodiments, the power transfer device 20 extends substantially vertically between the crankshaft 18 and the transmission drive shaft 24.

As will be further detailed herein, in certain embodiments, the first and second power transfer means 26a, 26b involve clutch plates which are rotatably connected to the transmission drive shaft 24. For example, as shown, in certain embodiments, the first power transfer means 26a is situated on the transmission drive shaft 24 so as to correspondingly rotate with such shaft 24. In such embodiment, the first power transfer means 26a is rotatably engaged with the second power transfer means 26b. Thus, via such indirect engagement with the transmission drive shaft 24, the second power transfer means 26b rotates opposite to the transmission drive shaft's rotation. While such configuration of the first and second power transfer means 26a, 26b is further detailed herein, it should be appreciated that the system 16 could be modified with the locations of the means 26a, 26b being exchanged.

The transmission 22 further includes a forward gear 32a and a reverse gear 32b that function in selectively rotating the drive shaft 28 of the endless loop flexible drive coupling 30, e.g., via rotatable engagement with the corresponding gear wheel 28a of the drive shaft 28. It should be appreciated that "forward" and "reverse" designations, with reference to the gears 32a and 32b, are merely used to indicate the corresponding opposing directions by which the drive shaft 28 can be rotated, and not for indicating traveling direction of a boat on which the outboard drive device 10 is fastened. To that end, while "forward" and "reverse" are used herein with reference to the gears 32a and 32b, other designations (such as "first" and "second") could have just as well been used. Furthermore, similar to that described above with reference to the power transfer means 26a and 26b, the locations of the forward and reverse gears 32a and 32b could be correspondingly exchanged.

In certain embodiments, as shown, the forward and reverse gears 32a, 32b are gear wheels. Depending on whether the outboard drive device 10 is set to rotate the propeller shaft in clockwise or counter-clockwise direction, the forward gear 32a or reverse gear 32b is selectively engaged with the corresponding first power transfer means 26a or second power transfer means 26b, respectively (while the other of the forward or reverse gears 32a, 32b is left unengaged). With continued reference to FIGS. 1 and 2, the forward gear 32a is positioned on the transmission drive shaft 24 and, in certain embodiments as shown, is situated internal to the first power transfer means 26a. To that end, the transmission drive shaft 24 functions as a gear shaft for rotating the propeller shaft 14 in one direction (e.g., clockwise direction). By way of comparison, the reverse gear 32b is positioned on a separate gear shaft 34 and, in certain embodiments as shown, is situated internal to the second power transfer means 26a so as to function for rotating the propeller shaft 14 in opposite direction (e.g., counter-clockwise direction).

For example, with reference to FIG. 1, when the outboard drive device 10 is set for rotating the propeller shaft 14 in a first (e.g., clockwise) direction, the forward gear 32a is lockingly engaged by the first power transfer means 26a. Thus, upon rotation of the transmission drive shaft 24 (e.g., via rotation of the crankshaft 18 in counter-clockwise direction A), the first power transfer means 26a and the forward gear 32a are correspondingly rotated (e.g., in counter-clockwise direction A). The forward gear 32a is engaged with the drive shaft 28 via threaded engagement with a gear wheel 28a of the shaft 28. To that end, given rotation of the first power transfer means 26a and its locking engagement with the forward gear 32a, the drive shaft 28 is correspondingly rotated, but in opposite direction (e.g., in clockwise direction B). The rotation of the drive shaft 28 correspondingly rotates the propeller shaft 14 (e.g., in clockwise direction B) via their connection by the endless loop flexible drive coupling 30.

In the case of the outboard drive device 10 being set for rotating the propeller shaft 14 in the first (e.g., clockwise) direction, the reverse gear 32b is correspondingly not lockingly engaged with the second power transfer means 26b. Thus, even though such second power transfer means 26b correspondingly rotates (in opposite direction) relative to rotation of the transmission drive shaft 24, due to the reverse gear 32b not being lockingly engaged with the second power transfer means 26b, the gear 32b rotates freely with the gear wheel 28a of the drive shaft 28 without any force applied therefrom to the shaft 28.

Conversely, with reference to FIG. 2, when the outboard drive device 10 is set for rotating the propeller shaft 14 in a second (e.g., counter-clockwise) direction, the reverse gear 32b is lockingly engaged by the second power transfer means 26b. Thus, upon rotation of the transmission drive shaft 24 (e.g., via rotation of the crankshaft 18 in counter-clockwise direction A and corresponding rotation of the first power transfer means 26a in same direction), the second power transfer means 26b is correspondingly rotated, but in opposing direction (e.g., in clockwise direction B), via its connection with the first power transfer means 26a. The reverse gear 32b is engaged with the drive shaft 28 via threaded engagement with the shaft's gear wheel 28a. To that end, given rotation of the second power transfer means 26b and its locking engagement with the reverse gear 32b, the drive shaft 28 is correspondingly rotated, but in opposite direction (e.g., in counter-clockwise direction A). The rotation of the drive shaft 28 correspondingly rotates the propeller shaft 14 (in counter-clockwise direction A) via their connection with the endless loop flexible drive coupling 30.

In the case of the outboard drive device 10 being set for rotating the propeller shaft 14 in the second (e.g., counter-clockwise) direction, the forward gear 32a is correspondingly not lockingly engaged with the first power transfer means 26a. Thus, even though such first power transfer means 26a correspondingly rotates relative to rotation of the transmission drive shaft 24, due to the forward gear 32a not being lockingly engaged with the first power transfer means 26a, the gear 32a rotates freely with the gear wheel 28a of the drive shaft 28 without any force applied therefrom to the shaft 28.

In view of the above, it should be appreciated that the outboard drive device 10 can be further configured to have a neutral mode. Particularly, such neutral mode would involve neither of the forward or reverse gears 32a, 32b being lockingly engaged with the corresponding first and second power transfer means 26a, 26b. In certain embodiments, the transmission 22 can also include additional gears or similar structure to change ratio of rotational speed of the propeller with respect to rotational speed of the crankshaft 16. Hence, the outboard drive device 10 is arranged with a transmission 22 so that the output power is reversible via the power coupling system 16, wherein the propeller shaft 14 (and propeller) can be driven (rotated) in a clockwise direction or a counter-clockwise direction via separate gear shafts 24 and 34, respectively.

While not previously referenced as such, it should be appreciated that the first and second power transfer means 26a, 26b can be correlated to separate clutch housings, while the corresponding forward and reverse gears 32a, 32b can be correlated to clutch discs corresponding to such housings. To that end, in certain embodiments, the forward and reverse gears 32a, 32b can be lockingly engaged with the corresponding power transfer means 26a, 26b via application of hydraulic pressure provided via a hydraulic pump (not shown).

In view of the above, it should be understood that the power coupling system 16 has many aspects that distinguish it from conventional outboard drive devices. For example, unlike known transmission types involving variable pulleys or automatic types, the embodied transmission 22 is manual actuated, and through use of the separate, yet similar gear shafts 24 and 34, the output power in rotating the propeller shaft 14 (and thus, a propeller connected thereto) in either clockwise or counter-clockwise directions can be provided to be substantially equal. In addition, via use of the interlocking gear wheels with the separate gear shafts 24 and 34 and drive shaft 28, the output power in driving the propeller shaft 14 in either of clockwise or counter-clockwise directions can be rotated with similar speed and with considerable power. Furthermore, with respect to the interconnection of the gear shafts 24 and 34 and further drive shaft 28 via gear wheels, the housing for the transmission 16 can be configured as more compact than has been conventionally known for outboard drive devices. For example, instead of a housing needing to accommodate a single horizontal shaft situating forward and reverse gears on opposing ends of the shaft, the separate shafts 24, 34 afford the corresponding housing to have reduced depth. Likewise, rotatably connecting the forward and reverse gears 32a 32b to the drive shaft 28 via gear wheels affords the corresponding housing to have reduced height. To that end, and with reference to FIGS. 1 and 2, in certain embodiments, the gear shafts 24 and 34 are made substantially parallel to each other (e.g., in same horizontal plane).

Regarding further aspects of the design, as shown in FIGS. 1 and 2, the crankshaft 18 and the transmission drive shaft 24 extend from a first side of the outboard drive device 10. To that end, in certain embodiments, the power transfer device 20 is arranged towards a hull or stern of the boat, wherein the crankshaft 18 and the transmission drive shaft 24 project away from such hull/stern.

Furthermore, in certain embodiments, the crankshaft 18, the transmission shaft 24, the further gear shaft 34, the drive shaft 28 of the endless loop flexible drive coupling 22, and the propeller shaft 14 extend in horizontal or substantially horizontal planes relative to vertical extent of the outboard drive device 10. For example, the crankshaft 18, the transmission shaft 24, the further gear shaft 34, the drive shaft 28 of the endless loop flexible drive coupling 22, and the propeller shaft 14 are arranged in parallel or substantially in parallel. Furthermore, in certain embodiments, various combinations of the shafts 24, 34, 28, and 14 extend from the outboard drive device 10 in one or more common planes. For example, the transmission and further gear shafts (collectively, the gear shafts) 24 and 34 can be in a common, e.g., horizontal or substantially horizontal, plane. As a further example, the crankshaft 18 and propeller shaft 14 can be distributed along a common, e.g., vertical or substantially vertical, plane. Alternatively, or in combination, the crankshaft 18 and/or the propeller shaft 14 can be distributed along a common, e.g., vertical or substantially vertical, plane with one or more of the transmission shaft 24, the further gear shaft 34, and the drive shaft 28 of the endless loop flexible drive coupling 30. Finally, while the forward and reverse gears 32a, 32b have been described as being situated on separate gear shafts 24, 34, the gears 32a, 32b could be supported/rotated using structure of the outboard drive device 10 (other than by shafts), while maintaining general positioning of the gears 32a, 32b in side-to-side manner within the transmission 16.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

What is claimed is:

1. An outboard drive device for a boat comprising:
a motor removably connectable to a hull of the boat, the motor having a crankshaft, wherein said outboard drive device further comprises a propeller shaft for rotating a propeller, the propeller shaft being arranged below the motor when the motor is connected to the hull of the boat, and a power coupling system for transferring power from the motor to the propeller shaft;
wherein the power coupling system comprises a transmission, the transmission comprising a transmission drive shaft, first and second power transfer means, corresponding forward and reverse gears, and a drive shaft, wherein the first and second power transfer means are selectively engageable with the corresponding forward and reverse gears, the transmission being positioned below the motor;
wherein the power coupling system at its input includes a power transfer device connecting the crankshaft of the motor with the transmission drive shaft, and the system at its output includes an endless loop flexible drive coupling connecting the drive shaft with the propeller shaft;
wherein the first and second power transfer means are rotatably connected with the transmission drive shaft, rotation of the transmission drive shaft resulting in corresponding rotations of each of the first and second power transfer means; and
wherein one of the forward and reverse gears is situated on a gear shaft of the transmission and other of the forward and reverse gears is situated on the transmission drive shaft, the forward and reverse gears rotatably engaged with the drive shaft and transferring power to said drive shaft when the forward or reverse gears are engaged by corresponding of the first and second power transfer means.

2. The outboard drive device of claim 1 wherein the crankshaft extends substantially horizontally from the motor.

3. The outboard drive device of claim 2 wherein the crankshaft is substantially parallel to the propeller shaft.

4. The outboard drive device of claim 3 wherein the crankshaft and propeller shaft are distributed in a common substantially vertical plane.

5. The outboard drive device of claim 4 wherein the crankshaft, the propeller shaft, and drive shaft are distributed in a common substantially vertical plane.

6. The outboard drive device of claim 1 wherein the gear shaft and the transmission drive shaft are distributed in a common substantially horizontal plane.

7. The outboard drive device of claim 1 wherein one or both of the power transfer device and the endless loop flexible drive coupling take the form of a belt connecting corresponding gear wheels.

8. The outboard drive device of claim 1 wherein the forward gear is situated on the transmission drive shaft and the reverse gear is situated on the gear shaft of the transmission.

9. The outboard drive device of claim 8 wherein the gear shaft is indirectly engaged with the transmission drive shaft.

10. The outboard drive device of claim 8 wherein the first power transfer means and forward gear are situated on the transmission drive shaft, wherein the first power transfer means rotates correspondingly with the transmission drive shaft.

11. The outboard drive device of claim 10 wherein the second power transfer means is rotatably engaged with the first power transfer means yet rotates opposite of the first power transfer means.

12. The outboard drive device of claim 1 wherein the forward and reverse gears are gear wheels, each rotatably connected with a gear wheel of the drive shaft.

13. The outboard drive device of claim 12 wherein the forward gear when engaged by the first power transfer means and rotated correspondingly rotates the gear wheel of the drive shaft, which results in corresponding rotation of the propeller shaft in a first direction.

14. The outboard drive device of claim 13 wherein the first direction is a clockwise direction.

15. The outboard drive device of claim 14 wherein the reverse gear when engaged by the second power transfer means and rotated correspondingly rotates the gear wheel of the drive shaft, which results in corresponding rotation of the propeller shaft in a second direction, the second direction being opposite of the first direction.

16. The outboard drive device of claim 1, wherein the forward and reverse gears are each arranged below the motor.

17. The outboard drive device of claim 16, wherein the drive shaft is arranged below the forward and reverse gears.

18. An outboard drive device for a boat comprising:
a transmission, the transmission comprising a transmission drive shaft, first and second power transfer means, corresponding forward and reverse gears, and a drive shaft, wherein the first and second power transfer means are selectively engageable with the corresponding forward and reverse gears;
an endless loop flexible drive coupling connecting the drive shaft with a propeller shaft extending below the hull of the boat, the drive shaft being positioned above the propeller shaft;
wherein the first and second power transfer means are rotatably connected with the transmission drive shaft, rotation of the transmission drive shaft resulting in corresponding rotations of each of the first and second power transfer means;
wherein the forward and reverse gears are gear wheels, one of the forward and reverse gear wheels situated on a gear shaft of the transmission and other of the forward and reverse gear wheels is situated on the transmission drive shaft, the forward and reverse gear wheels rotatably connected with a gear wheel of the drive shaft;
wherein the forward gear when engaged by the first power transfer means and rotated correspondingly rotates the gear wheel of the drive shaft, which results in corresponding rotation of the propeller shaft in a first direction; and
wherein the reverse gear when engaged by the second power transfer means and rotated correspondingly rotates the gear wheel of the drive shaft, which results in corresponding rotation of the propeller shaft in a second direction.

19. The outboard drive device of claim 18 wherein the forward and reverse gear wheels are separately situated in the transmission in side-to-side manner.

20. The outboard drive device of claim 18 wherein the gear shaft of the transmission and the transmission drive shaft are distributed in a common substantially horizontal plane.

21. The outboard drive device of claim 18 wherein the forward gear is situated on the transmission drive shaft and the reverse gear is situated on the gear shaft of the transmission.

22. The outboard drive device of claim 21 wherein the gear shaft is indirectly engaged with the transmission drive shaft.

23. The outboard drive device of claim 21 wherein the first power transfer means and forward gear wheel are situated on the transmission drive shaft, wherein the first power transfer means rotates correspondingly with the transmission drive shaft.

24. The outboard drive device of claim 23 wherein the second power transfer means is rotatably engaged with the first power transfer means yet rotates opposite of the first power transfer means.

25. The outboard drive device of claim 18 further comprising a motor, wherein the transmission transfers power from the motor to the propeller shaft and the motor is either an automotive engine or an industrial base engine.

26. The outboard drive device of claim 25 wherein the motor is a diesel V8 engine.

27. The outboard drive device of claim 25 wherein the transmission is part of a power coupling system and the motor is configured to provide output power to the power coupling system greater than 1000 hp.

28. The outboard drive device of claim 25 wherein the motor comprises a crankshaft that is substantially parallel to the propeller shaft.

29. The outboard drive device of claim 28 wherein the crankshaft and propeller shaft are distributed in a common substantially vertical plane.

* * * * *